(12) United States Patent
Bryson

(10) Patent No.: US 7,596,509 B1
(45) Date of Patent: Sep. 29, 2009

(54) COMPUTER SYSTEM AND METHOD FOR NEGOTIATING THE PURCHASE AND SALE OF GOODS OR SERVICES USING VIRTUAL SALES

(76) Inventor: Jeffrey Bryson, 32022 Isle Vista, Laguna Niguel, CA (US) 92677

( * ) Notice: Subject to any disclaimer, the term of this patent is extended or adjusted under 35 U.S.C. 154(b) by 960 days.

(21) Appl. No.: 09/609,231

(22) Filed: Jun. 30, 2000

(51) Int. Cl.
*G06Q 30/00* (2006.01)
(52) U.S. Cl. ....................................... 705/26
(58) Field of Classification Search ............... 705/26, 705/27
See application file for complete search history.

(56) References Cited

U.S. PATENT DOCUMENTS

| | | | |
|---|---|---|---|
| 5,309,513 A * | 5/1994 | Rose ..................... | 379/265.12 |
| 5,664,115 A | 9/1997 | Fraser ..................... | 705/37 |
| 5,710,887 A | 1/1998 | Chelliah et al. .......... | 395/226 |
| 5,717,989 A | 2/1998 | Tozzoli et al. ............ | 705/37 |
| 5,794,207 A | 8/1998 | Walker et al. ............ | 705/23 |
| 5,835,896 A | 11/1998 | Fisher et al. ............. | 705/37 |
| 5,890,138 A | 3/1999 | Godin et al. ............. | 705/26 |
| 5,905,975 A | 5/1999 | Ausubel .................. | 705/37 |
| 5,924,082 A | 7/1999 | Silverman et al. ........ | 705/37 |
| 6,026,376 A | 2/2000 | Kenney .................. | 705/27 |
| 6,035,288 A | 3/2000 | Solomon ................. | 705/37 |
| 6,282,517 B1 * | 8/2001 | Wolfe et al. ............. | 705/26 |
| 6,295,551 B1 * | 9/2001 | Roberts et al. ........... | 709/205 |
| 6,338,050 B1 * | 1/2002 | Conklin et al. .......... | 705/80 |
| 6,570,870 B1 * | 5/2003 | Berstis .................... | 370/352 |
| 6,728,684 B1 * | 4/2004 | Reichert ................... | 705/2 |
| 6,728,685 B1 * | 4/2004 | Ahluwalia ................ | 705/26 |
| 2001/0054064 A1 * | 12/2001 | Kannan .................. | 709/203 |
| 2002/0178069 A1 * | 11/2002 | Walker et al. ............ | 705/26 |

OTHER PUBLICATIONS

Lunt Dean, Car dealers hop on information highway, The patriot ledger, Oct. 24, 1996.*
PR Newswire, Carclub.com teams up with ebay to provide automotive service for ebay users, Aug. 3, 1999.*
Blumenstein Rebecca, Autos: Haggling in cyberspace transforms car sales, Wall Street Journal, Dec. 30, 1997.*

* cited by examiner

*Primary Examiner*—Mark Fadok
(74) *Attorney, Agent, or Firm*—Russo & Duckworth

(57) ABSTRACT

A computer and human interactive system and method for negotiating the purchase and sale of goods or services is provided. The system includes a plurality of primary seller terminals and at least one virtual seller terminal which are connected over a network, preferably the Internet, by a host processor to buyer terminals. The host processor connects buyers to sellers of goods according to information provided by the buyer such as the buyer's location and/or goods or services to be purchased. Where a primary dealer is unavailable to complete purchasing transactions, such as where the seller has closed for the day, a virtual seller is connected to the buyer to complete the purchasing transaction. Once a primary seller or virtual seller has been selected to complete a purchasing transaction with a buyer, the buyer and seller are connected by a real time data communications connection and a real time speech communications connection so that the buyer and seller may negotiate and complete a purchasing transaction.

19 Claims, 9 Drawing Sheets

Tracking #866487

Car Configurator

1. Start Here  [Any ▼]
2. Or Start Here: [Any ▼]
3. Enter Your Zip Code  Zip Code: [  ]
4. Begin Search: [Go!]

Available Colors:

- ☐ ■ Aquamarine Metallic
  - ☐ Agate    ☐ Mist Gray
- ☐ ■ Black
  - ☐ Agate    ☐ Camel/Tan    ☐ Mist Gray
- ☐ ▒ Bright Platinum Metallic
  - ☐ Agate
- ☐ ▒ Bright White
  - ☐ Agate    ☐ Camel/Tan    ☐ Mist Gray
- ☐ ■ Chili Pepper Red Pearlcoat
  - ☐ Agate    ☐ Camel/Tan
- ☐ ■ Flame Red
  - ☐ Agate    ☐ Camel/Tan    ☐ Mist Gray
- ☐ ▒ Forest Green Pearlcoat
  - ☐ Agate    ☐ Camel/Tan    ☐ Mist Gray
- ☐ ▒ Light Driftwood Satin Glow
  - ☐ Agate    ☐ Camel/Tan    ☐ Mist Gray
- ☐ ▒ Medium Bronze Pearlcoat
  - ☐ Agate    ☐ Camel/Tan
- ☐ ■ Patriot Blue Pearlcoat
  - ☐ Agate    ☐ Camel/Tan    ☐ Mist Gray

FIG. 6

Available Options

| | Invoice | MSRP |
|---|---|---|
| Brakes | | |
| ☐ Power Disc/Drum with 4 Wheel ABS | $421 | $495 |
| Convenience | | |
| ☐ Air Conditioning, Rear Bypass | N/C | N/C |
| ☐ Air Conditioning, Rear | $366 | $430 |
| Drive | | |
| ☐ 4 Wheel Full-Time | $336 | $395 |
| Engine | | |
| ☐ Magnum 5.9L 8 Cylinder 250 hp Gas | $506 | $595 |
| Interior | | |
| ☐ Floor Mats, Front and Rear | $47 | $55 |
| Mandatory | | |
| ☐ Warranty Enhancement (NY Only) | Dlr | Dlr |
| ☐ Emission Equipment (CA) | N/C | N/C |
| ☐ Emission Equipment, Border States | N/C | N/C |
| Other | | |
| ☐ Mopar Accesories | Dlr | Dlr |
| Paint | | |
| ☐ Clearcoat Metallic | N/C | N/C |
| ☐ Pearlcoat | N/C | N/C |
| ☐ Satin Glow | N/C | N/C |
| Safety | | |
| ☐ Mirrors, Power Foldaway including Mirrors, Outside Heated | $64 | $75 |
| Seats | | |
| ☐ Seat, 2 Passenger Third Row Folding Bench | $468 | $550 |
| Sound | | |
| ☐ Radio, AM/FM Stereo with Cassette, CD, EQ | $255 | $300 |
| ☐ Speaker System, Infinity | $281 | $330 |
| Tires | | |
| ☐ 31X10.5R15 All-Season SBR Goodyear OWL including Wheels, 15 inch x 8.0Aluminum, Wheels, 15-inch Aluminum 5-Spoke, Moldings, Wheel Lip, Spare Tire, 31X10.5R15 All-Season SBR Goodyear OWL | $395 | $465 |
| ☐ P235/75R15XL All-Terrain Radial Goodyear Wrangler OWL | $213 | $250 |

FIG. 7

Loan Worksheet

Deal Information

| | |
|---|---|
| Existing Deals | [Load] |
| Salesperson | YOUR NAME HERE |
| Deal Date | 6/27/00 |
| VIN | 12345000000 * |
| Stock # | 1200 * |
| Costs | $71195  $71195  $81564 |
| | Cost*  Invoice*  MSRP* |

Costs

| | |
|---|---|
| Vehicle Price | $75000 ᴄ |
| Accessories | $800 ᴄ |
| Warranties | $400 ᴄ |
| GAP Insurance | $ * |
| Total Price | $76200 |
| Sales Tax | $5874.5 |
| Luxury Tax (inc. Gas Guzzler Tax) | $0 |
| License Fee | $ |
| Doc Fee | $45 * |
| Total Costs | $82119.5 |

Down Payment

| | |
|---|---|
| Trade #1 | |
| ACV | $ ᴄ |
| Payoff | $ * |
| Net Trade #1 | $ * |
| Trade #2 | |
| ACV | $ ᴄ |
| Payoff | $ * |
| Net Trade #2 | $0 * |
| Cash Down | $10974 ᴄ |
| Pick Up #1 | $ * |
| Days | * |
| Pick Up #2 | $ * |
| Days | * |
| Total Cash Down | $10974 |
| Mfr Rebate | $ * |
| Total Down | $10974 |

Payments

| | |
|---|---|
| Amount Financed | $71145.5 |
| Term | 72 months ᴄ |
| First Payment | 45 days * |
| APR | 20 % * |
| Add On Rate | 12.42 % * |
| Buy Rate | 19 % * |
| Participation | 70 % * |
| Sales Tax Rate | 7.75 % * |
| Finance Charge | $53022.09 |

Profit

| | |
|---|---|
| Vehicle Profit | $3805 |
| Accessories Profit | $0 |
| Warranties Profit | $0 |
| Finance Profit | $1855.77 |
| Total Profit | $5660.77 |

Monthly Payment

| | |
|---|---|
| | $1724.55 * ᴄ |
| Start Payments | 8/11/2000 |

Name of Deal [ ]
[Save Deal Information] [Reset Numbers]

* Changable
*Italics* Computed ONLY

Tell Me About Financing:

The loan calculator allows you to figure out the monthly payments on the perfect vehicle that fits your budget.

MSRP: $20000

Your Price: $20000

Sales Tax: 7.75 %

Enter the purchase price of the vehicle you are interested in and then proceed to the finance calculator on the right to find the monthly payment most comfortable for you.

Change the cash down, the monthly payment, find the right term for your pocketbook, the APR that best fits your credit profile, and the monthly payment that is most comfortable for your budget.

After changing any of the numbers, please press tab to obtain the updated calculation.

Finance Calculator:

Loan Financing
Cash Down: $2000
First Monthly Payment: 30 Days
APR: 8.50 %

Term & Monthly Payments:
3 year   4 year   5 year   6 year
$612.25  $478.05  $397.92  $344.81

Lease Financing
•Cash Reduction: $2000
Money Factor: 3.60
Residual Percentage: 40 %

Term & Monthly Payments:
2 year   3 year   4 year   5 year
$552.00  $401.68  $326.51  $281.42

Residual percentage is based upon depreciation of the car over term. This will be completely different for each vehicle. All payments and prices include all known

FIG. 8

COMPUTER SYSTEM AND METHOD FOR NEGOTIATING THE PURCHASE AND SALE OF GOODS OR SERVICES USING VIRTUAL SALES

BACKGROUND OF THE INVENTION

The present invention relates to improved apparatus and methods for facilitating the negotiations for the purchase and sale of goods or services. More particularly, the invention relates to a system and method for selling goods or services having negotiable prices over a global computer network such as the Internet. Even more particularly, the present invention relates to improved systems and methods for facilitating the negotiation and sale of large scale transactions such as automobile purchases, which are typically negotiated. To this end, the present invention provides an apparatus and method that preferably uses the Internet to bring together a purchaser with a seller of goods or services to complete in real time the selection, price, negotiation, sale and financing of goods or services.

There are numerous methods for matching buyers and sellers of various goods or services. On the most basic level, an individual buyer might discover the goods or service being offered for sale through advertising or word of mouth, and then directly contact the seller. Once communication has commenced, negotiations take place which may or may not result in a consummated sales transaction.

For large scale transactions, such as for the purchase of automobiles or real estate, the process is usually more complicated. First, the buyer will wish to narrow his search according to certain criteria such as price, size and location. Where the goods sought to be purchased is an automotive vehicle, the criteria will typically also include the vehicle's manufacturer, model, year of manufacture, as well as numerous additional options such as color, engine size, etc. This criteria permits the buyer to avoid spending time looking at goods which are of only tangential interest or of no interest at all, and instead focus on goods which most suit the buyer's needs.

Recently, the global computer network, commonly referred to as the Internet, has been used not only for the advertising of goods or services, but also as a place for completing purchasing transactions. Typically, Inter net websites where merchandise or services can be purchased consist of a picture or description of the goods or services being offered, the price at which such goods or services are being offered and an order form for a customer to enter personal or payment information. Such sites are not well suited for the sale of goods or services that are typically negotiated, such as unique, surplus, high volume, discontinued items, negotiable services, or large scale transactions such as real estate or automobiles. The known commercial websites are interactive only to the extent that a customer is able to select a particular item for purchase and to enter payment and shipment information. Such websites include so-called "auction" sites in which potential buyers may submit their own price that they are willing to pay for a particular product until a set deadline has expired. This bidding process on the Internet does not allow a purchaser to negotiate directly with the seller of the goods or services.

For example, U.S. Pat. No. 5,890,138 issued to Godin describes a computer auction system enabling consumers to bid on different products utilizing their home computer. The price varies according to the number of bids submitted by consumers and the amount of time remaining in an established time limit. U.S. Pat. No. 5,924,082 issued to Silverman et al. describes a computerized matching system for matching potential buyers and sellers of commodities. Buyers and sellers are capable of transmitting parameters for a sale to one another, but the system does not provide direct negotiations to facilitate the purchase and sale of goods or services. Meanwhile, U.S. Pat. No. 6,035,288 issued to Solomon describes a system enabling buyers to negotiate, and "haggle", with a computer for the purchase of goods or services. The computer is programmed to simulate human behavior but a human is not utilized in the negotiation process. In addition, U.S. Pat. No. 5,664,115 issued to Fraser describes a communications network such as the Internet which is used to connect buyer terminals with seller terminals for facilitating the purchase and sale of real estate. Potential buyers are automatically evaluated to determine whether they meet minimum criteria for the purchase of specific property listed. Again, these systems do not provide the means for buyers and sellers to both utilize the benefits of the Internet, namely the billboard-type communication of goods or services to be sold, with the ability to negotiate the purchase and sale of such goods or services which is typically available only in face to face transactions.

The difficulties with purchasing and selling of goods over the Internet is most obvious in connection with the sale of automobiles wherein the culture of automobile shopping has always included negotiating or "haggling" prior to consummation of a vehicle sale. The reason for such negotiations is that consumers typically require such communications to ensure that they are obtaining the best deal possible. This is particularly true as the net cost for automobiles may vary greatly from location to location due to such factors as dealer overhead, shipping costs, dealer rebates, etc. However, recent attempts to sell vehicles over the Internet have eliminated the ability for buyers and sellers to negotiate directly resulting in both buyers and sellers of automobiles being unsatisfied with their Internet transaction experience. At present, automotive e commerce is fragmented and inconsistent. Moreover, current automotive e commerce systems fail to provide either an automotive service relationship or long-term customer satisfaction which are two of the most important aspects of automobile sales necessary for long term success and profitability.

Currently, there are three types of automobile e commerce companies. First, automotive dealers often have their own websites which advertise the dealer and vehicles located at that specific dealer, and which typically direct website viewers to contact the dealer directly by telephone or to go to the dealer in person. These dealer websites lack sophistication and are helpful only to website viewers who reside in proximity to that specific dealer. Moreover, these dealer websites are not typically interactive as they do not provide consumers with the ability to buy such a vehicle, let alone actually negotiate the purchase of a vehicle. At best, a dealer website is merely an electronic version of a newspaper flyer.

A second type of automobile e commerce company generally only refers a buyer to an automotive dealership. These referral e commerce companies typically advertise various manufacturers and models of vehicles. Once a vehicle has been selected by a purchaser, the sale is "referred" to a dealer requiring that the purchaser await contact from a dealership which typically takes one to two days if all, or the purchaser has to call the dealership directly, a situation similar to using the yellow pages to select a dealership. Unfortunately, referral e commerce companies usually do not provide information on the actual availability of a specific automobile, nor do they provide information on price, or other options. These referral companies include CarBuyers.com™ which is a compilation of newspaper classified ads, Autobytel.com™ which is a referral service which charges participating dealers a fee, Dealernet.com™ which lists participating dealers, Carpoint-.msn.com™ which is Microsoft's referral site and AutoVantage.com™.

The third type of automobile e commerce company provides direct sales of vehicles to buyers. Unfortunately, these companies do not typically make provision for the purchaser to test drive the vehicle. In fact, this provision would be disadvantageous to a direct sale e commerce company as once a purchaser goes to a local dealership to test drive the automobile, the dealership has unwittingly been supplied with a customer from a competitive website.

Moreover, if a purchaser actually buys a vehicle over the Internet, the purchaser is not provided with a place for servicing the vehicle if problems arise with the new vehicle. In addition, if warranty work is required, it is often very difficult to find a dealership that is willing to provide free service of a vehicle which has been purchased from others. Direct sales e commerce companies includes CarPrices.com™ which will deliver a vehicle to a local dealer, CarsDirect.com™ which delivers a vehicle directly to the customer location without dealer involvement, iMotors.com™ and Greenlight.com™ which typically also deliver the vehicle to the customer's location.

Thus, there exists a need for a dynamic and interactive computer initiated system which is capable of facilitating the buying and selling of goods or services, particularly automotive vehicles, over the global computer network.

In addition, it would be highly desirable to provide a system and method which combines the data communication advantages of the Internet with the ability to negotiate directly and in real time with a seller of goods or services.

Moreover, it would be advantageous to provide an improved network system which not only provides for direct real time speech communication with a seller of goods or services, but also provides for a supplemental sales organization which is capable of taking over negotiations when the primary seller has ceased operating for the day.

SUMMARY OF THE INVENTION

The invention is directed to facilitating the negotiation and sale of any goods or services. However, since the invention is believed to have particular application in the automotive industry, the invention will be described herein particularly in connection with the buying and selling of automotive vehicles. It should also be understood that though the terms "goods", "products", "services", etc. are used throughout the following description of the invention, these terms are intended to be substantially interchangeable in connection with application with the present invention.

Briefly, in accordance with the invention, an interconnected computer network system is provided including a host processor which connects buyers and sellers through remote computer terminals, referred to herein as buyer computer terminals and seller computer terminals, respectively. Inventory of respective sellers is recorded in each seller's computer terminal which is accessed continuously or periodically by the host processor system to create and maintain a database of the inventory of all goods or services offered for sale by all sellers connected to the network system. A buyer which connects to the host processing system, such as through the Internet or other similar computer network, is requested to provide buyer identification information such as personal consumer related data such as the consumer's name, state and/or zip code, and/or goods or services transaction related information such a product's manufacturer and model name or number. The host computer processor includes processing means for analyzing the buyer identification information and transaction related information provided by the consumer and compares that information to data within its databases to automatically match potential buyers of goods or services with sellers of goods or services that are most suitable for meeting the buyer's purchasing needs. The host computer then connects the buyer to the seller through the computer network to provide a "real time" data connection between the buyer and seller. The data connection provides for immediate written messaging between the buyer and seller, and also enables the buyer and seller to access data stored on the counterpart's buyer or seller computer or stored in the host processor's database.

In addition, in accordance with the invention, the system includes establishing a "real time" speech connection between the buyer and seller for enabling the buyer and seller to speak with one another in real time to negotiate and complete the sale of goods or services. In a first embodiment, after the host processor has selected a particular seller for conducting the transaction, the host processor provides the buyer with a telephone number, preferably toll free, which is displayed on the buyer's computer terminal display, and instructs the buyer to call that number. The telephone number corresponds to a telephone line which connects the buyer directly to the host processor. After receiving the call, the host processor then automatically routes the telephone call through the host processor to the selected seller so that the buyer and seller can talk and negotiate directly. In an alternative embodiment, the host processor provides the buyer with the seller's telephone number and instructs the buyer to call that number to speak directly with the seller.

In an additional preferred embodiment of the invention, the host processor is connected to a financial institution credit database which stores information relating to the credit history of potential buyers. Preferably, either before or after the host processor connects a potential buyer to a seller through their respective buyer and seller terminals, the host processor obtains sufficient information of the potential buyer to identify the individual, such as utilizing their social security number, to determine whether their credit history warrants the sale of goods or services to the potential buyer. The review of this credit information can be used to merely accept the buyer for transacting a sale or can be used to create a credit history or credit rating such as a FICO score which may be transmitted to the seller for display on the seller's terminal. At this point, the seller can either accept or reject the buyer as suitable for completing the sales transaction, or in the alternative, the seller may require that additional steps be made by the buyer prior to sales transaction completion. For example, the seller may simply require an increased deposit or the acquiring of an independent loan prior to completing the sales transaction.

In an additional preferred embodiment of the invention, the network system of the present invention includes a "virtual" sales system. The virtual sales system operates to take the place of a "primary" seller when the primary seller is no longer capable of negotiating or completing a sales transaction. For example, the Internet is accessible 24 hours a day, 365 days a year. However, many sellers of goods or services are only open eight to twelve hours a day. During periods where the seller is "closed", the seller is no longer capable of negotiating or completing a sales transaction resulting in wasted opportunities. Where the primary seller is unavailable for negotiating the sale of its own products or services, the host processor connects the buyer directly to the virtual seller system which includes its own computer terminal. The virtual seller system obtains all necessary inventory and pricing information from the primary seller through the host processor which stores a summary of the seller's inventory in the host's inventory database. Utilizing the inventory and pricing data of the primary seller, the virtual seller negotiates and completes the transaction with the buyer in identical fashion as would the primary seller. More particularly, the host processor initiates a data communications connection between the buyer's computer terminal with the virtual computer terminal so that the buyer and seller can transmit transaction related information, such as product, offer price, counter offer price, financing, restrictions, etc., back and forth for display on each other's computer. In addition, a real time speech connection is also created between the potential buyer and virtual seller. The speech connection may be created by the buyer making a traditional phone call to the virtual seller by calling a telephone number which is displayed by the host processor on the buyer's screen. The speech connection may also be an audio link, or preferably also a video link, over the Internet where the buyer and virtual seller's terminals include teleconferencing technology.

In operation, a buyer looking for goods or services, for example an automobile, would search the Internet utilizing known search engines to find numerous databases which store pertinent information regarding automobiles sought to be purchased. The buyer would also encounter numerous websites dedicated to selling vehicles including the website dedicated to the host processor of the present invention. The potential buyer visiting the website of the host processor is first be requested to submit their name and zip code. The host processor then assigns an alpha-numeric tracking number to enable the host to record and track communications and results relating to any negotiations and/or sale of a vehicle to the buyer. After receiving the buyer's zip code, the host processor searches its internal dealer database for affiliated sellers which are located within a predetermined distance of the buyer. For example, by analyzing the buyer's zip code, the host processor searches for and attempt to find an affiliated seller within, for example, thirty miles of the buyer by comparing the relative longitudes and latitudes specified by the buyer's zip code and affiliated sellers' zip code. If an affiliated seller is not determined to be located within the predetermined distance, in a preferred embodiment the predetermined distance is expanded until an affiliated seller is located. In the alternative, the host processor waits to receive additional information from the potential buyer before selecting a particular seller for selling a vehicle.

Still in connection with the buying and selling of vehicles, the host processor prompts the potential buyer to provide transaction related information such as the manufacture, model, year, color and vehicle options of the vehicle sought to be purchased. Based upon this additional information, the host processor then attempts to assign a seller affiliate for purposes of facilitating the sale of a vehicle, or if a seller affiliate has already been assigned, the host processor will compare the information relating to the sought to be purchased with the vehicles which are within the affiliated seller's inventory. Of importance, the dealer continuously, or periodically, provides a summary of its inventory to the host processor so the host processor can make informed decisions regarding the assignment of an affiliated seller to negotiate the transaction, and for purposes of ensuring that the potential buyer is provided with the greatest number of selections. If the host processor is unable to find a vehicle which matches the description provided by the potential buyer, the host processor prompts the potential buyer to change one or more features of the vehicle which the buyer wishes to purchase. For example, where a purchaser indicates that it wishes to buy a vehicle of a particular color, and the color is not available, the buyer will be requested to select an alternative color. This process will continue until the sought to be purchased vehicle matches a vehicle in the host processor's inventory database.

Once the vehicle is located, the dealer possessing the vehicle is identified which again is preferably at a location near to the potential buyer. The host processor then immediately creates a data communications connection between the buyer's computer terminal and a computer terminal located at the identified dealer. Preferably, this connection through the host processor utilizes the Internet. However, other data link connections can be made as would be understood by those skilled in the art. The data link provides the potential buyer and the dealer with a "real time" link enabling the dealer to transmit detailed transaction related information regarding the vehicle including a picture of the vehicle, its price, vehicle options, financial purchasing or leasing options, etc. to the potential buyer. In addition, the seller and his computer terminal preferably is connected to the seller's inventory database for displaying information relating to the seller's additional inventory which can also be used during negotiations with the buyer. Moreover, the data connection permits the buyer to transmit transaction related information back to the dealer such as counteroffers, additional requested vehicle options, financing information, etc., during the negotiations.

In a preferred embodiment, once a dealer has been identified, the host processor provides the potential buyer with a telephone number which is transmitted and displayed on the potential buyer's terminal. The buyer is instructed to call this telephone number, and after having done so, the potential buyer is connected by telephone to the dealer's representative who is operating the dealer's computer terminal. In a first embodiment, by calling the telephone number, the buyer is connected directly to the host processor. Once connected, the host processor provides an automatic recording to the buyer asking the buyer to punch in their alpha-numeric tracking number into their telephone's keypad. After having done so, the host processor utilizes the alpha-numeric tracking number to identify the caller on the other end of the telephone and utilizes the tracking number to identify the seller which has been selected to conduct the sales transaction. The host processor then routes the telephone call to the selected seller which preferably already has transaction related information, such as the vehicle and its features, on their computer terminal display.

In this manner, not only does the dealer have a direct data communications connection with the potential buyer, but a real time speech link is provided which enables the buyer and seller to discuss, and negotiate, the purchase of the vehicle. The invention therefore provides both the capability of transmitting data over the Internet for display to a potential buyer, and the capability of negotiating the purchase of an automobile with a real live person.

In an additional preferred embodiment of the invention, instead of a telephone link between the potential buyer and dealer, the speech communications connection is made by audio and video teleconferencing over the Internet. Where the potential buyer and seller both have a camera and microphone connected to their computer terminal, audio visual signals are transmitted between the computer terminals so that the potential buyer and seller may communicate and negotiate in a "face to face" manner.

In an additional aspect of the present invention, once a dealer has been selected for negotiating with a potential buyer, it is first determined whether the selected "primary" dealer is "open" for business. For example, most automotive dealers are only open ten to twelve hours a day. Once the primary dealer has closed for the day, the dealer may not have the man-power to provide direct real time data communications or speech communication capabilities with a potential buyer. Accordingly, where the dealer is closed for the day, the host processor creates a data communications link between the potential buyer's computer terminal and the virtual seller's computer terminal. The virtual seller accesses the inventory database of the host processor which stores all necessary information regarding the inventory of the selected dealer, including the makes, models and prices of the vehicles as well as the vehicle's colors and options. Once the data communications link between buyer and virtual seller has been completed, the potential buyer is requested to initiate a speech connection using the public switching telephone network (PSTN) or a teleconferencing link utilizing an Internet connection. The virtual seller then negotiates and completes transactions in similar manner as would the primary dealer.

Advantageously, the present invention provides for the combination of Internet technology to transmit data instantaneously over great distances, with the ability to negotiate in real time as previously only provided by "brick and mortar" retail companies.

Another advantage of the present invention is that consumers are provided with the ability to purchase goods or services over the Internet and still communicate in a "face to face" manner.

Still an additional advantage of the present invention is that sellers are provided with the capability of creating relationships with customers so as to facilitate a servicing relationship in the future.

Other features and advantages of the present invention will be appreciated by those skilled in the art upon reading the detailed description whi ch follows with reference to the attached drawings.

BRIEF DESCRIPTION OF THE DRAWINGS

FIG. 6 illustrates a preferred car configuration routine for purchasing a vehicle with the network system of the present invention;

FIG. 7 illustrates a preferred financial worksheet as used by a seller for selling a vehicle with the network system of the present invention; and FIG. 8 illustrates a preferred financial worksheet as used by a buyer for purchasing a vehicle with the network system of the present invention.

DETAILED DESCRIPTION OF THE INVENTION

Figure 1:
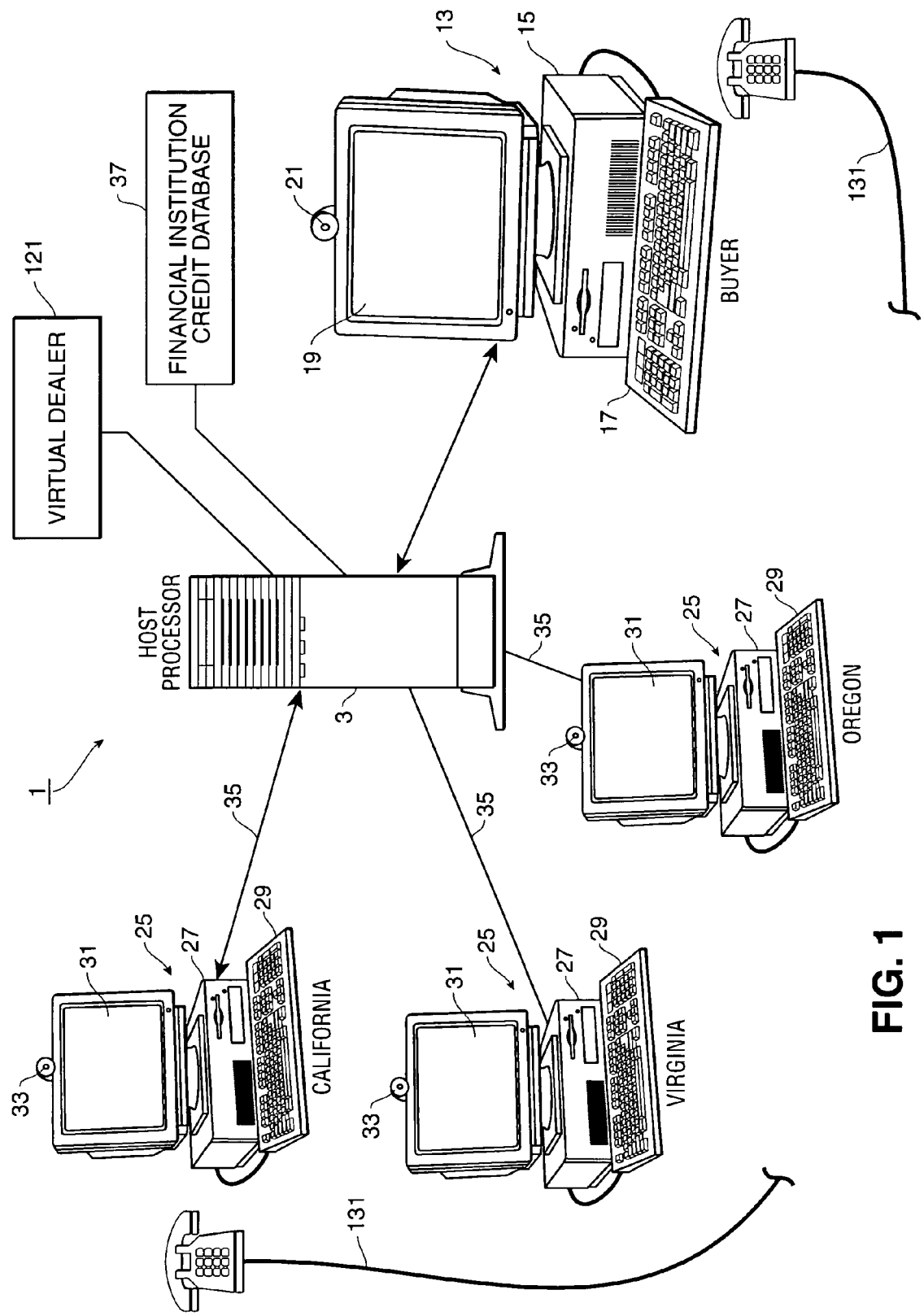
FIG. 1 is a schematic block diagram illustrating the functional components of the network system of the present invention.

While the present invention is susceptible of embodiments in various forms, there is shown in the drawings and will hereinafter be described the presently preferred embodiments of the invention with the understanding that the present disclosure is to be considered as an exemplification of the invention and it is not intended to limit the invention to the specific embodiments illustrated.

Figure 3:
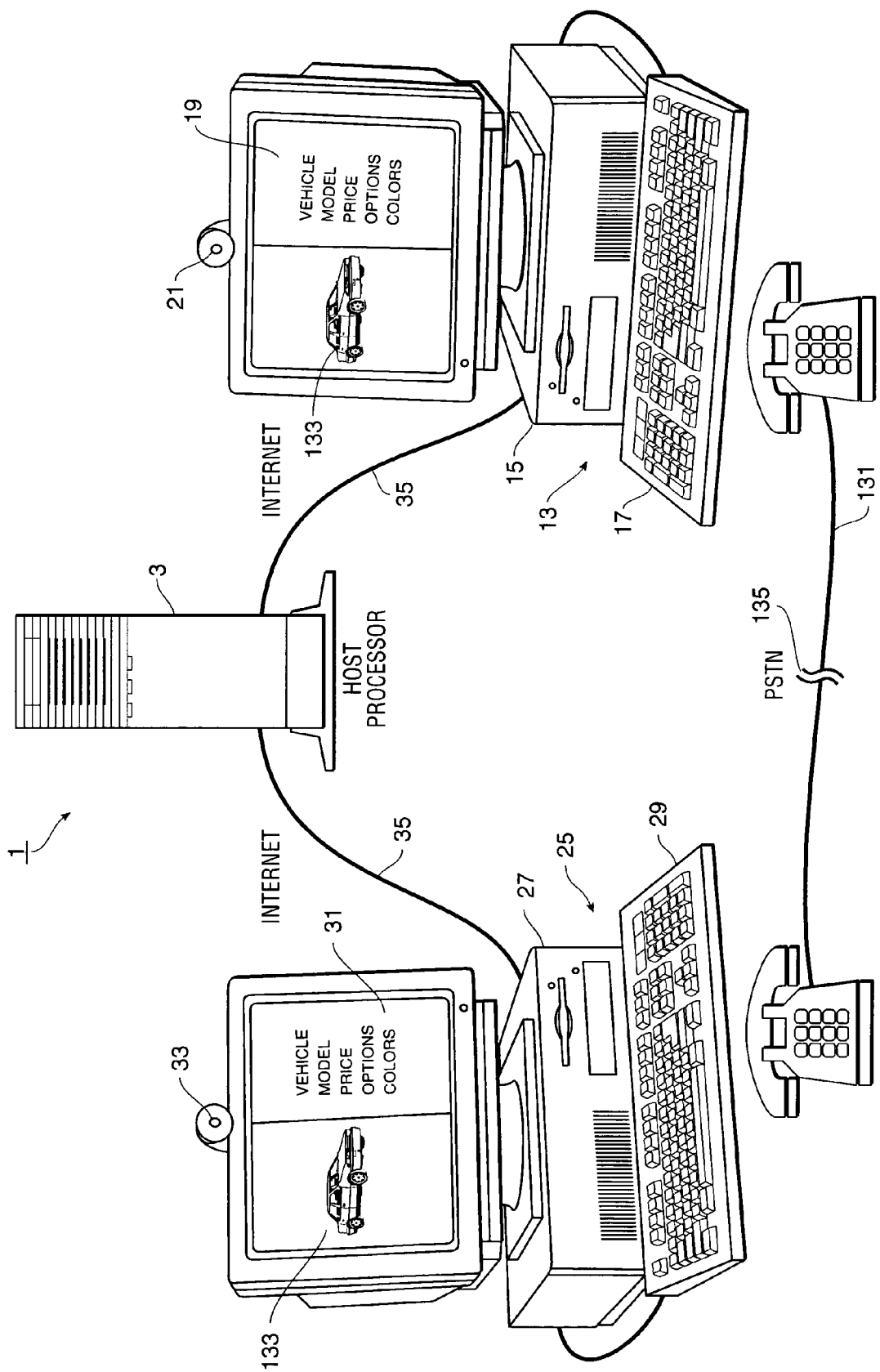
FIG. 3 illustrates a preferred embodiment of the invention wherein buyer and seller are connected by a data communications link over the Internet and a speech communications link over the public switching telephone network (PSTN)

With reference to FIGS. 1 and 3, the present invention provides an electronic and human interactive system for negotiating the purchase and sale of goods or services, preferably over the Internet's World Wide Web. The network system 1 of the present invention includes a central host computer 3 which is attached to a wide area network (WAN) hub which serves as a primary communications link with other controllers and interface devices connected to the Internet. As would be understood by those skilled in the art, the host processor 3 may be a traditional web server including only a single computer or may include a plurality of computers. The host processor 3 interfaces with the network system 1 with a protocol understood by the network. For example, where the network utilizes the Internet, Transmission Control Protocol/Internet Protocol (TCP/IP) will typically be used.

The network system 1 further includes a plurality of buyer terminals 13 which typically include a central processing unit 15, input-output devices such as a video display 19, keyboard 17 or mouse. When accessing the Internet's World Wide Web, potential buyers are presented with a series of web pages for which they must navigate to find areas of interest. In accordance with a preferred embodiment, the host processor 3 is operatively connected to the Internet and has a first "home page" remotely accessible to a prospective buyer. This home page permits a potential buyer to determine what goods or services are offered for sale through the network system 1.

The network system 1 of the present invention further includes a plurality of sellers which may be located across the country, such as reflected in FIG. 1 in California, Virginia, Oregon, etc. Each of these remote sellers have computer terminals 25 which in turn also include central processing units, and input/output devices such as video displays, keyboards and mouses. The seller computer terminal 25 also includes memory in the form of read only memory (ROM) or computer disk (CD) memory for storing inventory records summarizing the inventory of goods or services which are offered for sale by the seller over the network system 1. The seller computer terminals 25 are preferably connected to the host processor 3 through the wide area network of the Internet. The host processor 3 continuously or periodically accesses each seller's inventory database and copies and stores that information in its own database of inventory held by all sellers throughout the entire network. Preferably, the host processor 3 updates its inventory database at least every day, and preferably hourly or continuously, to determine which good or services have been sold by the affiliate sellers. In a separate locator database, the host processor 3 also stores an identification of each seller connected to the network system 1 and the seller's geographical location by zip code, and/or longitude and latitude to form a seller locator database.

With reference to FIG. 1, in a preferred embodiment, the host processor 3 is connected to a financial institution credit database such as provided by Trans Union™, Equifax™ or Esperian™. The connection may be by an Internet connection or by a local area network (LAN) connection. The financial institution credit database provides information relating to the credit of potential buyers who access the network system 1 for providing a credit score or the like for determining whether potential buyers are financially capable of purchasing goods or services which are offered for sale.

In still an additional preferred embodiment of the invention, the network system 1 includes a virtual seller 41. The virtual seller 41 is substantially similar to other sellers in the network system 1 in that the virtual seller 41 includes a computer terminal having a central processing unit, and input/output devices including keyboard, mouse and video display. However, the virtual seller 41 does not maintain an inventory of its own to sell. Instead, as explained in greater detail below, the virtual seller 41 accesses the host processor's inventory database for pertinent inventory records of "primary" sellers in the network to sell their goods when requested.

Figure 2A:
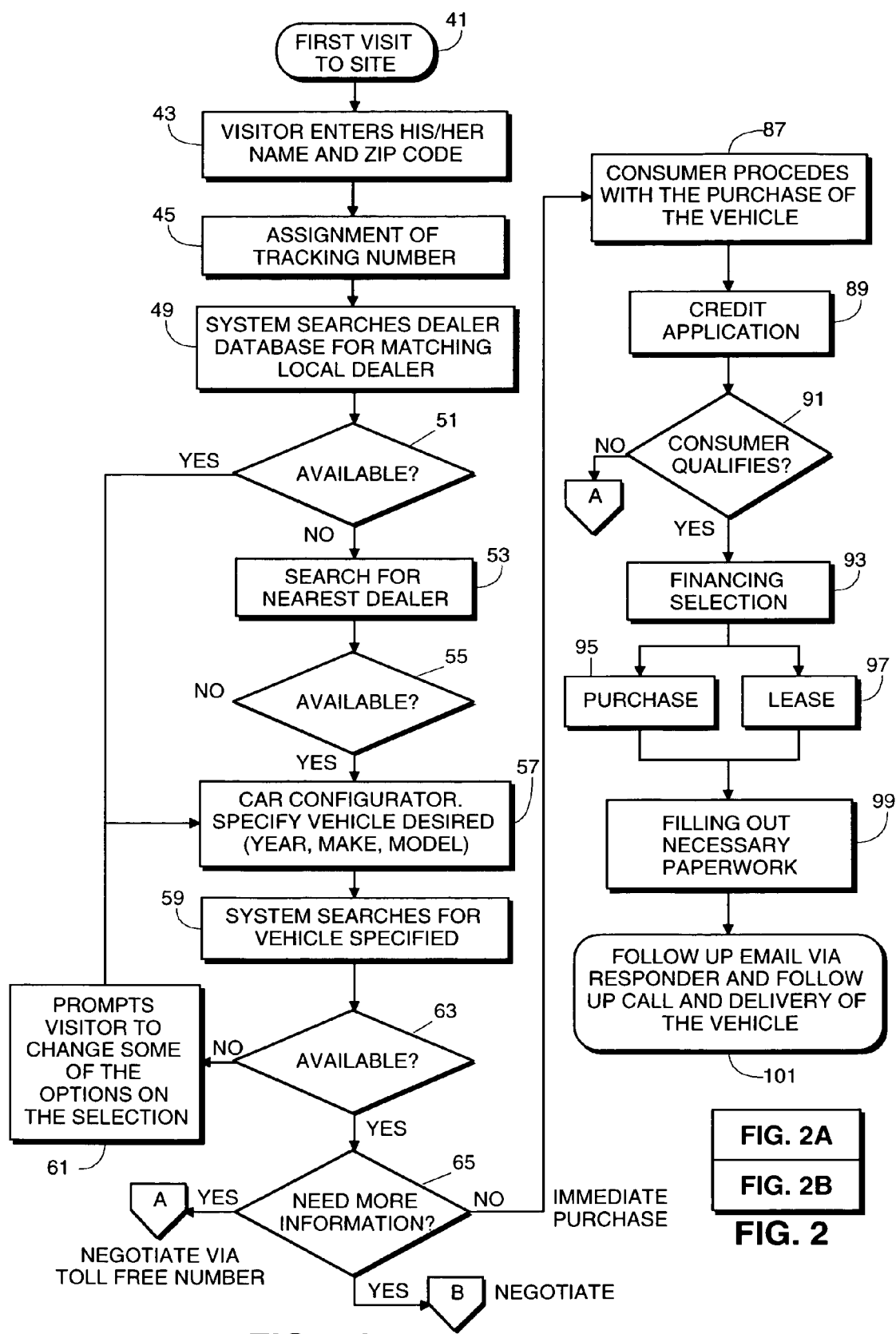
FIG. 2 is a flow chart illustrating a typical method of using the network system of the present invention.
Figure 2B:
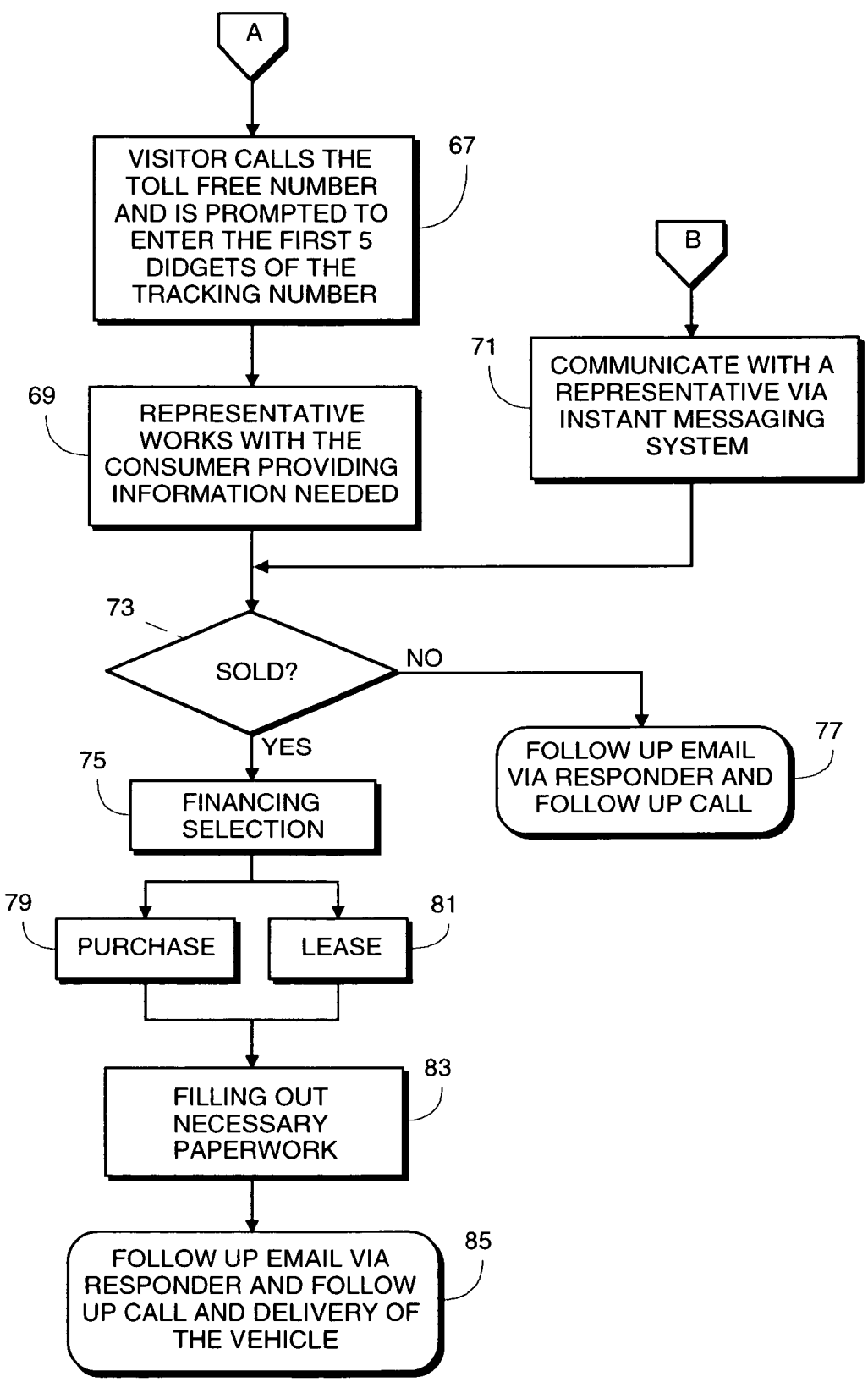

With reference to FIGS. 2A and 2B, the practice of the present invention includes a potential buyer going on-line with his or her computer terminal to search the World Wide Web for goods or services sought to be purchased. For purposes of example, where the consumer is looking to purchase a particular automotive vehicle, a consumer would typically introduce key words for searching the Internet for the vehicle sought to be purchased, such as the manufacture, model, etc. Upon visiting the website 41 associated with the host processor 3, the potential buyer would be asked to provide their name and zip code 43. The host processor 3 thereafter assigns a tracking number 45 to the buyer for tracking communications between the buyer and seller and transactions made by the buyer. The host processor 3 then accesses its database of affiliated dealers 49 and compares the potential buyer's location with the locations of its dealers to determine if any dealers are located within proximity to the potential buyer. If an affiliate dealer is located within proximity to the potential buyer, the dealer is selected 51 as the particular dealer to effect negotiations and transactions with the potential buyer. If a dealer is not within proximity to the potential buyer, in a first embodiment, the nearest affiliate dealer 53 is selected. Meanwhile, in a second embodiment, if no dealer is within proximity to the potential buyer, the host processor 3 selects the virtual dealer to negotiate a transaction with the potential buyer. (See FIG. 5).

Figure 5:
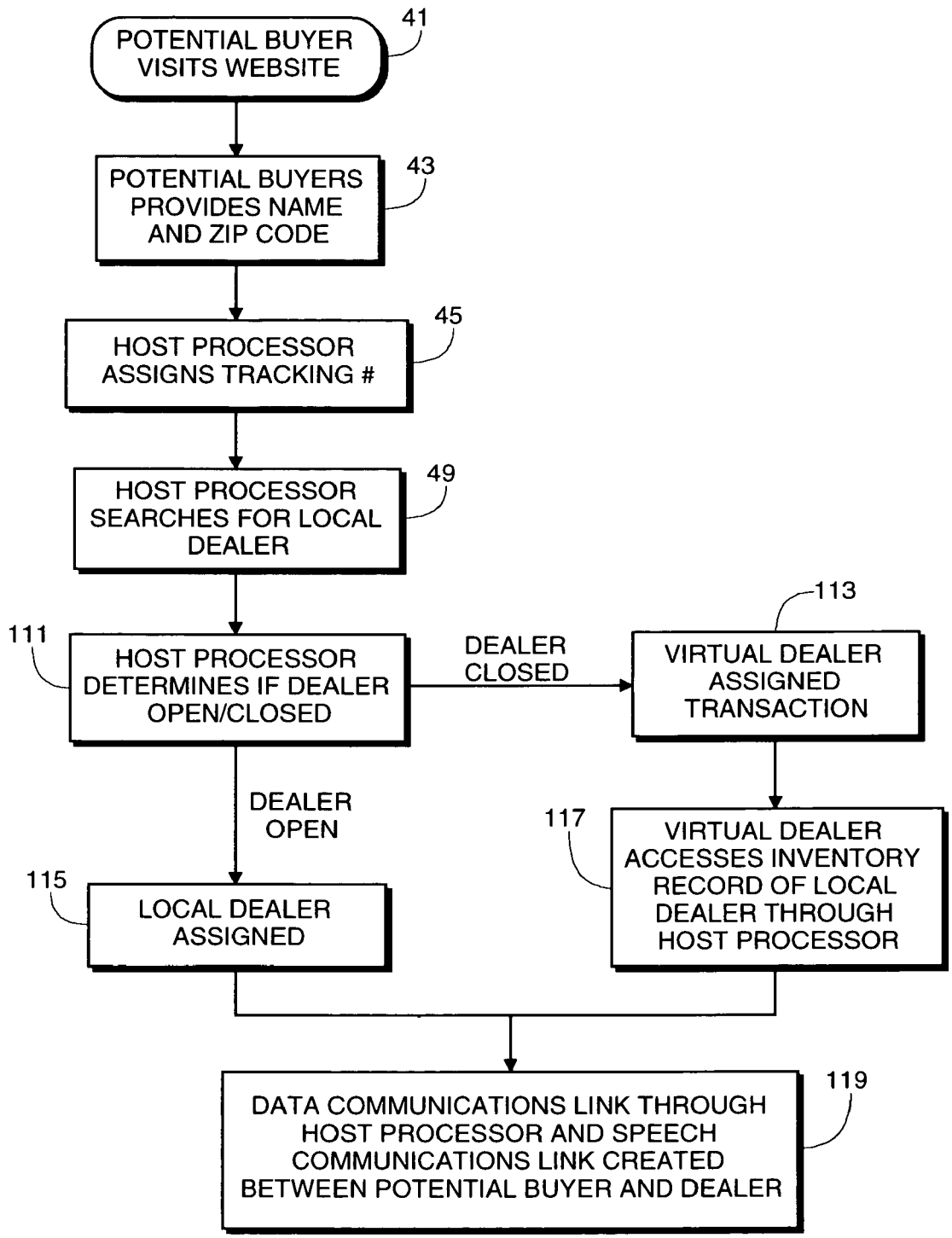
FIG. 5 is a flow chart illustrating the selection of a primary seller or virtual seller of the present invention.

With reference also to FIG. 5, after selecting a local dealer, the host processor 3 determines if the dealer is open or closed for business 111. Open or closed for business is a determination of whether the dealer has available personnel to initiate real time communication with a potential buyer. The dealer may be closed for the day, or a person may not be available at the dealership due to scheduling problems, temporary under staffing, etc. The host processor 3 may determine whether the dealer is open or closed by comparing the time of day and date with dealer scheduling records which are provided to the host processor 3, or in the alternative, the host processor 3 can contact the dealer terminal and provide an inquiry as to whether personnel are available. If the host processor 3 determines that the dealer is determined to be open, the host processor 3 assigns the transaction to the dealer 115. Meanwhile, if it is determined that the dealer is closed, the virtual dealer is assigned the transaction 113. Where the virtual dealer has been assigned the transaction, the virtual dealer accesses the inventory records of the local dealer 117 which have been stored within the databases of the host processor 3. Thereafter, the virtual dealer and primary local dealer negotiate the transaction 119 in substantially identical manner.

With reference to FIGS. 2A, 2B and 6, either prior to assigning a primary dealer or virtual dealer to handle the transaction, the host processor 3 initiates a car configuration routine 57 in which the potential buyer is requested to specify in detail the actual vehicle desired, including specifics such as manufacture, model, year, color, engine, size, options, etc. In a first embodiment, the potential buyer has already been connected directly to the dealership for direct real time negotiations. In an alternative embodiment, the host processor 3 first initiates the car configurations routine 57 prior to searching its dealer database for a local dealer. This embodiment enables the host processor 3 to review dealerships' inventory to determine whether a local dealer carries requested vehicle models prior to assigning it to a particular dealer. Moreover, instead of utilizing just a comparison of the location of the local dealer to the potential buyer, preferably the host processor 3 also considers the potential buyer's desired vehicle 59, and the dealer's inventory of vehicle's and their options to provide the customer with the best matches available from which to select a desired vehicle.

With reference to FIG. 6, in a preferred embodiment, if a particular vehicle which has been requested by the potential buyer is not available, the host processor 3 prompts the buyer 61 to change some of the options on his selection until a vehicle is available from a nearby dealer. Once a vehicle has been selected by a potential buyer as being acceptable 63, the potential buyer is provided with three options by the network system 1. First, the potential buyer is provided with the opportunity to purchase the vehicle immediately on-line 87, in similar manner to direct sales e commerce sites presently available on the Internet. If the potential buyer selects this option, the consumer is provided with an on-line credit application 89 which the buyer can fill out on his own computer terminal 25. Once the potential buyer has qualified 91, he is provided financing options such as purchasing the vehicle 95 or leasing the vehicle 97. Any additional paperwork can be filled out by the buyer on-line 99 and the vehicle is delivered 101 to the purchaser's home or to a dealer within the purchaser's vicinity.

Figure 4:
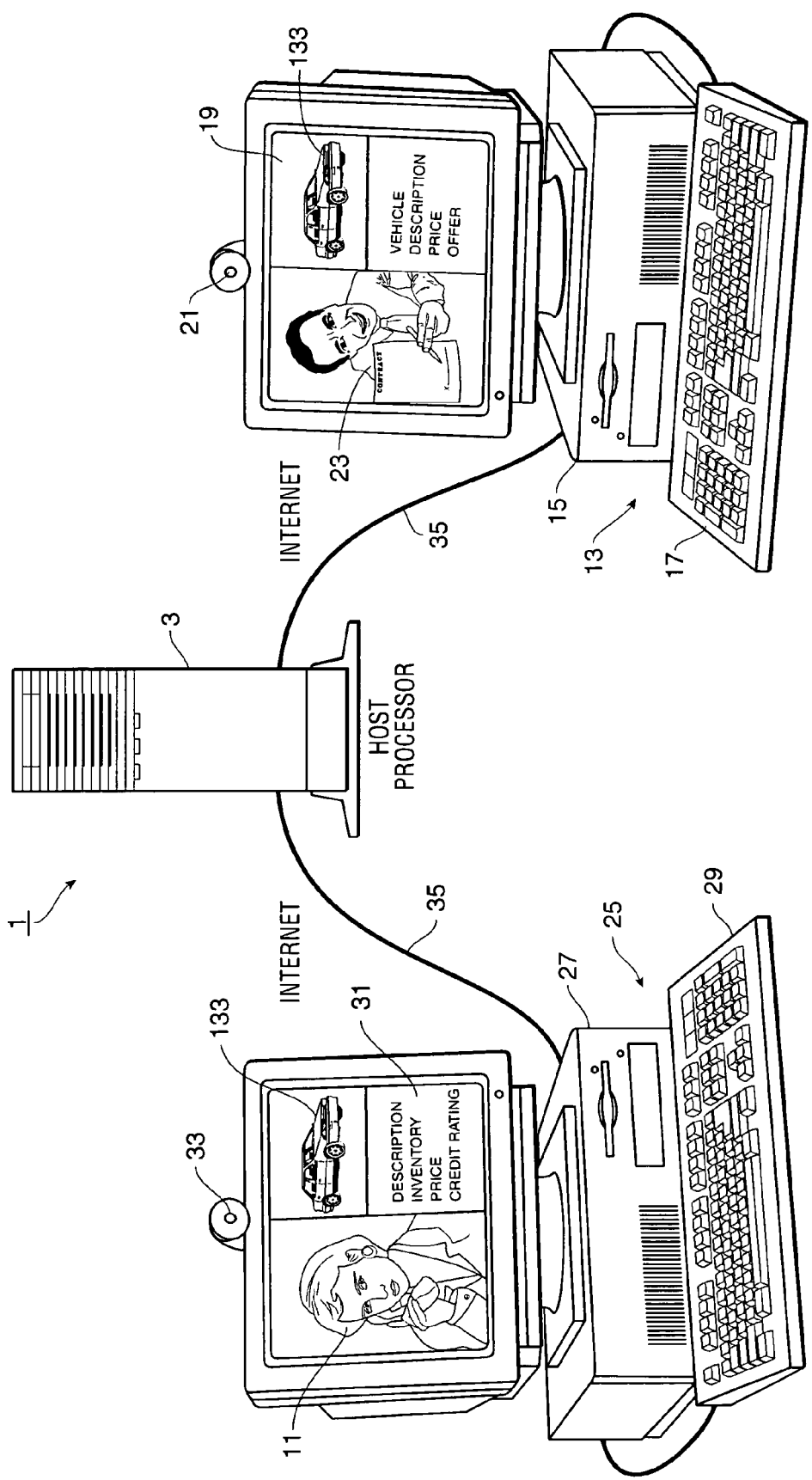
FIG. 4 illustrates an additional preferred embodiment of the invention wherein a buyer and seller are connected by a data communications link and a speech communications link including teleconferencing.

With reference also to FIGS. 1, 3 and 4, as an option to directly purchasing the vehicle on-line, the network system 1 of the present invention provides for a direct real time data connection 35 over the Internet between the potential buyer 11 and dealer 23. More particularly, once a dealer has been selected, the host processor 3 initiates an additional connection with the dealers computer terminal 25 to connect the potential buyer's computer terminal 13 to the dealer's computer terminal 25. This data connection preferably provides instant messaging which enables the buyer and seller to transmit data in real time over the Internet for display to each other.

The data connection may be constructed of numerous means known to those skilled in the art. In a preferred embodiment, the data communications connection is a virtual information exchange database in which the dealer and buyer instantaneously exchange information with each other through a designated portion of the host processor's memory and processing capability. The virtual information exchange database works as follows. Any information entered by a buyer or seller into their computer keyboards is instantaneously transmitted to the host processor 3 and stored in memory. The host processor 3 in turn immediately updates the other's display screen to display that information. In a preferred embodiment, the virtual information exchange database is controlled using a Java Database Controller (JDBC) which is a protocol used to transmit information between databases. The JDBC system looks for changes in a database and upon seeing changes immediately updates a computer connected to the database. Contrary to prior art systems which periodically poll remote computers looking for changes, the JDBC system provides for transmitting a small application program, called an applet, from the host processor to the buyer's computer terminal. In connection with the present invention, the applet instantaneously sees changes and transmits those changes to the seller's computer terminal connected to the network. Moreover, the applet preferably provides for instantaneously calculating and recalculating of financing information on the buyer and seller's computer terminals to quickly update price, interest rates, down payment, monthly payment amount, number of payments, etc. as these provisions are changed during negotiations. The actual creation of such applets can be determined by those skilled in the art.

Using the data communications connection 35, the potential buyer and seller provide instant messaging to one another to transmit information such as the vehicle's invoice amount, manufacturer's suggested retail price (MSRP), financing options, comparisons to other vehicles, dealer rebates, etc. Moreover, the data connection provides the customer and sales person with the ability to provide instant messaging to negotiate the sale of the vehicle in real time.

As an additional and preferred option for facilitating the negotiation and sale of an automobile, the network system 1 of the present invention also includes a speech communications link 131 between the potential buyer and dealer. Accordingly, not only is a real time data communications connection 35 provided for between the potential buyer and seller, but a real time speech communications link 131 between the buyer and seller is also provided. With reference to FIGS. 1, 2 and 3, in a preferred embodiment, the host processor 3 provides a toll-free telephone number for display on the potential buyer's display 19. Upon calling the telephone number 67, the potential buyer is connected directly to the host processor. The host processor then provides a pre-recorded message to the buyer asking the buyer to provide their alpha-numeric tracking number. After doing so, the host processor 3 utilizes the tracking number to identify the buyer and the selected dealer pertaining to the particular transaction. The host processor then automatically forwards, or routes, the telephone call to the dealer which has been selected to handle the transaction 69. Preferably, the dealer representative which is communicating in real time to the potential buyer over the data communications connection 35 is also the same person who is assigned to communicate with the potential buyer over the speech communications connection 131. In an alternative embodiment, the host processor provides the telephone number of the selected dealer on the buyer's computer display. The buyer is instructed to call this number, and after having done so, the buyer has a direct speech communications connection with the dealer. Moreover, as a result of the data communications connection 35, the dealer and customer will also already have displayed on their respective computer terminals the price information and vehicle features of the vehicle sought to be purchased when the speech communications connection is completed. Preferably, the data communications link 35 will also provide a picture or photograph of the vehicle 133 to each computer terminal. Since a data connection simply does not provide buyers with the ability to communicate their desires sufficiently to assure them that their needs are being met, the network system 1 of the present invention provides the speech communications link 131 so that the potential buyer and dealer may talk to one another in real time to satisfactorily negotiate the purchase of a vehicle.

With reference to FIG. 4, in an additional preferred embodiment, the speech communications link 131 includes real time teleconferencing between the buyer and dealer. For this embodiment, the buyer and sellers' computer terminals 13 and 25 include a microphone and camera 21 and 33 which provide for audio and video to be transmitted over the Internet connection through the host processor 3. Accordingly, not only can the vehicle 133 and vehicle features be displayed on the buyer and sellers' computer terminals 13 and 25, but the buyer 11 can communicate with the seller 23 in a face to face manner over the Internet. It is this real time speech communications or "face to face" communications which enables the network system 1 of the present invention to create relationships between the customer and buyer which creates customer goodwill and facilitates the creation of a business relationship for future sales.

With reference to FIGS. 2B, 7 & 8, once the purchase price of the vehicle has been agreed upon 73, the buyer 11 is provided with the ability to finance their vehicle over the Internet. The buyer 11 is preferably provided with both purchasing 79 and leasing 81 options, and any necessary paperwork 83 is prepared and executed directly over the Internet. For example, FIG. 7 illustrates a financial worksheet 141 provided to the vehicle dealer for assisting the buyer in obtaining a car loan. Though the worksheet is configured particularly for use in providing the buyer with loan information, a similar worksheet, not shown, would be utilized when the buyer wishes to lease the vehicle. The worksheet includes information such as sale price, interest rates, fees, down payments, and payment schedules. The altering of any of the amounts of these purchasing factors by the dealer instantaneously results in the calculation and alteration of the other factors on the dealer's computer display due to the use of the Java Database Controller (JDBC), and preferably also simultaneously corrects the information displayed on the buyer's computer terminal display 19. In addition, as shown, the dealer worksheet preferably displays additional information such as the transaction profit which would not be displayed on the buyer's financial worksheet. With reference to FIG. 8, the buyer may also be provided with a financial calculator 143 which enables the buyer to calculate and recalculate the terms of loans and leases having varied purchasing factors.

As shown in FIG. 1, preferably the host processor 3 is connected to a financial institution credit database 37 which enables the host processor 3 to perform credit checks of the potential buyer 11 and determine whether financial institutions will extend the customer with a loan. Preferably, the database 37 also includes tax information relating to the sales tax and fees of each state, county and municipal area to automatically prepare the loan applications for execution by the buyer. In a preferred embodiment, the 73,000 taxing jurisdictions within the United States are updated at least on a weekly basis by the network system 1 to provide accurate loan and sales agreements. The database 37 may also provide the buyer 11 with information on automobile insurance if desired by the buyer.

The previous examples have been described in connection with a "primary" dealer being assigned to negotiate the sale of the vehicle. However, where the virtual dealer 121 has been selected to negotiate the transaction, the virtual dealer 121, which utilizes a human for direct negotiating, will do so in identical manner as would a primary dealer. By accessing the dealer inventory database of the host processor 3, the virtual dealer is provided with a summary of the primary dealer's inventory. Thus, the virtual dealer 121 is provided with transaction related information relating to particular vehicles of the primary dealer which is displayed on his computer screen, and which may be selectively simultaneously displayed on the seller's computer screen over the data communications link 35. The virtual dealer is also connected to the buyer using the speech communications link 131 over the public switching telephone network 135, or a teleconferencing link over the Internet, to provide real time speech communication 35 between buyer 11 and virtual seller 121. In this manner, even when the dealership is closed for the night, the network system 1 of the present invention provides for 24 hour, 365 day capabilities for selling vehicles located across the country. Any transaction communications between the buyer 11 and virtual dealer 23 are then communicated to the primary dealer so that when a dealership opens in the morning, any sales which have been completed during the evening can either be finalized or simply recorded by the dealer. The customer can then show up at the dealership and pick up the purchased car. In fact, the customer may, or may not, determine that they were communicating with a virtual dealer during the transaction process.

The invention therefore provides for the benefits of Internet technology with old-fashioned speech negotiations to facilitate the purchase of goods or services. Though the invention has been described with particularity to the negotiation and sale of automobiles, the invention is believed to have application to the sale other goods or services.

Having described the invention in such terms to enable those skilled in the art to make and use it, and having identified the presently preferred embodiments thereof, I claim:

1. A network system for facilitating the negotiation and purchase of goods or services for buyers and sellers, the system comprising:
   a host processor system;
   at least one buyer computer terminal including a display, operated by buyer of goods or services;
   at least one primary seller computer terminal including a display, operated by a primary seller of goods or services for selling the goods or services of the primary seller;
   a virtual seller computer terminal including a display, operated by a virtual seller of goods or services who is not the primary seller for selling the goods or services of the primary seller, said virtual seller not possessing custody or control of the goods or services of the primary seller but having a database storing product information concerning the goods or services of the primary seller;
   a first real time two-way communication connection for selectively connecting said buyer computer terminal to said primary seller computer terminal or said virtual computer seller through said host processor system, said first communication connection for transmitting transaction data concerning the purchase of goods or services of said primary seller, input by a buyer into said buyer computer terminal, in real time to said seller computer terminal or to said virtual seller computer terminal for display to said seller and for transmitting transaction data, input by a seller into said seller computer terminal or said virtual seller computer terminal, in real time to said buyer computer terminal for display to the buyer;
   said host processor system including processing means for selectively connecting a buyer computer terminal to either a primary seller computer terminal or a virtual seller computer based upon predetermined criteria, and
   a sale agreement means for enabling a buyer to reach an agreement concerning the purchase of goods or services from a either a virtual or a primary seller over the network system.

2. A network system for facilitating the negotiation and purchase of goods or services for buyers and sellers of claim 1 wherein said predetermined criteria includes a determination of whether the primary seller has ceased sales operations.

3. A network system for facilitating the negotiation and purchase of goods or services for buyers and sellers of claim 2 wherein said primary seller operates and ceases sales operations during predetermined periods of the day and said host processor processing means connects a buyer computer terminal to a virtual seller computer based upon a determination that said primary seller has ceased sales operations for the day.

4. A network system for facilitating the negotiation and purchase of goods or services for buyers and sellers of claim 1 wherein said predetermined criteria includes a determination of whether a primary seller is located within a predetermined distance of the buyer.

5. A network system for facilitating the negotiation and purchase of goods or services for buyers and sellers of claim 1 wherein said predetermined criteria includes a determination of whether a primary seller is located within a predetermined distance of the buyer and a determination of whether the primary seller has goods or services sought to be purchased by the buyer.

6. The network system for facilitating the negotiation and purchase of goods and services for buyers and seller of claim 1 wherein the goods or services include vehicles.

7. The network system for facilitating the negotiation and purchase of goods and services for buyers and seller of claim 5 wherein the goods or services include vehicles.

8. A network system for facilitating the negotiation and purchase of goods or services for buyers and sellers of claim 1 further comprising:
   a second communication connection for connecting a buyer operating said buyer computer terminal and a primary seller operating said primary seller computer terminal or virtual seller operating said virtual seller computer terminal, said second communication connection permitting real time speech communication between buyers and sellers for facilitating the real time spoken negotiations for the purchase and sale of goods or services over the network system.

9. A network system for facilitating the negotiation and purchase of goods or services for buyers and sellers of claim 2 further comprising:
   a second communication connection for connecting a buyer operating said buyer computer terminal and a primary seller operating said primary seller computer terminal or virtual seller operating said virtual seller computer terminal, said second communication connection permitting real time speech communication between buyers and sellers for facilitating the real time spoken negotiations for the purchase and sale of goods or services over the network system.

10. The network system for facilitating the negotiation and purchase of goods and services for buyers and seller of claim 8 wherein the goods or services include vehicles.

11. A method of facilitating the negotiation and purchase of goods or services for buyers and sellers comprising the steps of:
   providing a host processor system interconnected with at least one primary seller of goods or services, at least one virtual seller who is not the primary seller for selling the goods or services of the primary seller, said virtual seller not possessing custody or control of the goods or services of the primary seller but having a database storing product information concerning the goods or services of the primary seller; and a plurality of buyers of goods or services;
   transmitting buyer identification information by a buyer to the host processor system;
   selecting the virtual seller or a primary seller by the host processor system based upon predetermined criteria;
   providing a real time two-way data connection between the buyer and the selected primary seller or virtual seller for transmitting transaction data from the buyer in real time for visual display of the purchase data to the seller and for transmitting transaction data from the seller in real time for visual display of the purchase data to the buyer, and agreeing over the network system to the purchase of goods or services from a primary or virtual seller.

12. The method for facilitating the negotiation and purchase of goods or services for buyers and sellers of claim 11 further comprising the step of:

determining whether the primary seller has ceased sales operations; and selecting the virtual seller or a primary seller by the host processor system is based upon the determination of whether the primary seller has ceased sales operations.

13. The method for facilitating the negotiation and purchase of goods or services for buyers and sellers of claim 12 wherein said primary seller operates and ceases sales operations during predetermined periods of the day.

14. The method for facilitating the negotiation and purchase of goods or services for buyers and sellers of claim 11 further comprising the step of:

determining the location of the buyer; and the step of selecting the virtual seller or a primary seller by the host processor system is based upon the determination of the location of the buyer.

15. The method for facilitating the negotiation and purchase of goods or services for buyers and sellers of claim 11 further comprising the steps of:

determining the location of the buyer; and determining what goods or services are sought to be purchased by the buyer; and the step of selecting the virtual seller or a primary seller by the host processor system is based upon the determination of the location of the buyer and the determination of what goods or services are sought to be purchased by the buyer.

16. The method for facilitating the negotiation and purchase of goods or services for buyers and sellers of claim 11 further comprising the step of:

providing a second communication connection between a buyer and a primary seller or virtual seller, the second communication connection permitting real time speech communication between the buyers and sellers for facilitating the real time spoken negotiations for the purchase and sale of goods or services over the network system.

17. The method for facilitating the negotiation and purchase of goods or services for buyers and sellers of claim 15 further comprising the step of:

providing a second communication connection between a buyer and a primary seller or virtual seller, the second communication connection permitting real time speech communication between the buyers and sellers for facilitating the real time spoken negotiations for the purchase and sale of goods or services over the network system.

18. The network system for facilitating the negotiation and purchase of goods and services for buyers and seller of claim 11 wherein the goods or services include vehicles.

19. The network system for facilitating the negotiation and purchase of goods and services for buyers and seller of claim 16 wherein the goods or services include vehicles.

* * * * *